(No Model.)  2 Sheets—Sheet 1.
F. H. CHILTON.
EMBROIDERING ATTACHMENT FOR SEWING MACHINES.
No. 322,902. Patented July 28, 1885.
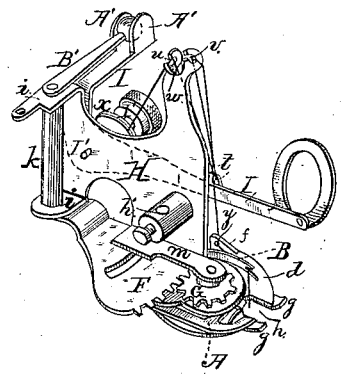
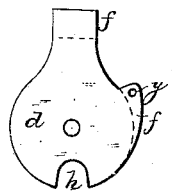
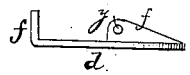
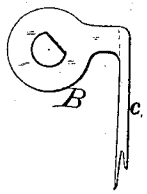
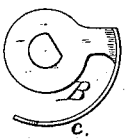
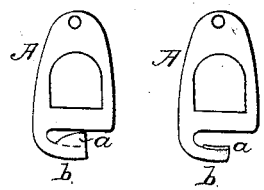
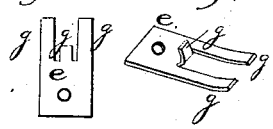
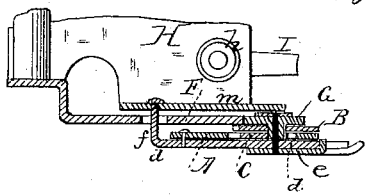
Witnesses:
J. Walter Fowler
Herman Guston
Inventor:
Franklin H. Chilton
By Chas. L. Gill
Attorney.

(No Model.) 2 Sheets—Sheet 2.
F. H. CHILTON.
EMBROIDERING ATTACHMENT FOR SEWING MACHINES.
No. 322,902. Patented July 28, 1885.
Fig. 11.
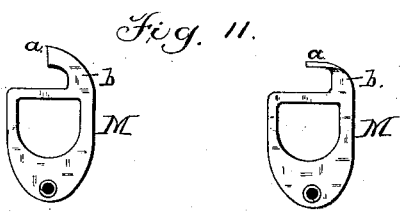
Fig. 12. Fig. 13.
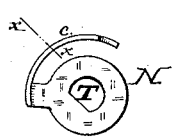 
Fig. 14.
Fig. 15.
Fig. 16.
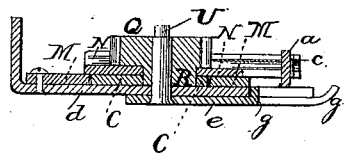
Attest:
A. P. C. Hamilton
Herman Gustow
Inventor;
Franklin H. Chilton,
By Chas. C. Gill
Attorney.
N. PETERS, Photo-Lithographer, Washington, D. C.

UNITED STATES PATENT OFFICE.

FRANKLIN H. CHILTON, OF NEW YORK, N. Y., ASSIGNOR TO THE EMPRESS EMBROIDERER COMPANY, OF SAME PLACE.

EMBROIDERING ATTACHMENT FOR SEWING-MACHINES.

SPECIFICATION forming part of Letters Patent No. 322,902, dated July 28, 1885.

Application filed June 12, 1883. (No model.)

*To all whom it may concern:*

Be it known that I, FRANKLIN H. CHILTON, a citizen of the United States, residing at New York, in the county of New York and State of New York, have invented certain new and useful Improvements in Embroidering Attachments for Sewing-Machines; and I do hereby declare the following to be a full, clear, and exact description of the invention, such as will enable others skilled in the art to which it appertains to make and use the same.

The invention relates to an improvement in embroidering attachments for sewing-machines, as will be hereinafter fully described, and particularly pointed out in the claims.

The invention which is the subject of this application is an improvement upon that described and claimed in Letters Patent of the United States granted to the Empress Embroiderer Company, assignee of myself, on the 1st day of August, 1882, the said patent being numbered 262,002.

Referring to the accompanying drawings, Figure 1 is a perspective view of an embroiderer embodying my invention. Fig. 2 is a vertical section of the lower part of said embroiderer. Figs. 3 to 10, inclusive, are detached views illustrating the method of constructing certain parts of the embroiderer, hereinafter referred to by letter. Figs. 11 to 15, inclusive, are detached views of a modified construction of the foot and attachments of the embroiderer, and Fig. 16 is a sectional view showing the elements illustrated in Figs. 11 to 15 combined.

In the said drawings, A denotes the thread-detainer; B, the thread-carrier; C, the actuating-cam, and F and G the rack and pinion, respectively, which impart motion to the carrier, detainer, and cam, in the manner described in said Letters Patent. These operative devices are the same in their general construction as the like elements shown and described in said Letters Patent No. 262,002, and will be readily understood. The thread-detainer A has upon its front portion the hook $b$, which is provided at its inner edge with a lip, $a$, as shown in Fig. 8. The carrier B has a thread-arm, $c$, as shown in Fig. 6, and is described in Letters Patent No. 262,002 aforesaid.

The foot of the attachment consists of two parts $d$ $e$. (Shown in Figs. 3, 4, 9, and 10.) The part $d$, which is the main portion of the foot, has upon its rear end the upwardly-projecting portion $f$, which is connected with the frame or bracket H, as indicated in Fig. 2.

The part $e$ of the presser-foot consists of a plain piece of sheet metal having the ears or projections $g$. This part $e$ is used to elevate the main portion of the foot above the work, and when in position the central projection, $g$, is turned upward into the opening $h$, made in the front portion of the part $d$, for the purpose of permitting the movement of the sewing-needle, and forms a means of preventing any movement of the said part $e$. The two side projections of the part $e$ extend forward at each side of the opening $h$, as indicated.

The means for sustaining the presser-foot and actuating parts of the attachment is a bracket, H, which is of peculiar form, and advantageous in that it fulfills the functions of several sustaining devices.

Between the ears $i$ on the rear end of the bracket H is mounted the post $k$, by which the ratchet F is actuated. In the flange $m$ at the lower front portion of the bracket H is secured the rear end of the presser-foot $d$, said end being inserted through a slot formed in said flange and riveted therein. The flange $m$ projects forward beyond the end of the bracket and extends over the pinion and ratchet actuating mechanism, and serves to prevent them from being injured or losing their relation with each other. Upon the side of the bracket is secured the hub and the set-screw $h'$, by which the attachment is secured to the presser-bar of the machine.

The operating-lever I is formed from a piece of sheet metal, and is mounted upon a pivot, I', at the rear portion of the bracket H. Upon the side of the lever I, about midway between its ends, is formed the small hook $t$, the purpose of which will be hereinafter described.

Upon the upper rear portion of the lever I are the lips A', between which is placed one end of the reciprocating arm B', the other end of which is rigidly connected with the post $k$, and which arm serves to convey motion from the said lever to the post.

Upon the upper forward extremity of the bracket H are formed the slotted eyes $u\ v$, and between said eyes the central slot, $w$. The eyes $u\ v$ are formed in ears, which in the construction of the device are bent at right angles to the vertical portion of the bracket, whereby the ears are brought opposite to each other, and are directly, or nearly so, over the hook $t$ on the lever I. The hook $t$ and the eyes $u\ v$ form the take-up mechanism. The embroidering-thread passes from the tension $x$ through the eye $u$, thence downward under the hook $t$, and then upward and through the eye $v$, after which it passes downward to the eye $y$, and thence to the thread detainer and carrier, by which it is manipulated. The reciprocating motion of the lever I operates to draw the embroidering-thread, whereby the loops formed by the carrier and detainer are given the proper size.

The operation of the attachment hereinbefore described is exactly similar to that set forth in the Letters Patent hereinbefore referred to, and, being now well known, need not be repeated.

In Figs. 11 to 16, inclusive, I illustrate a modification of the detainer and carrier, which are lettered in these figures M N, respectively. In the detainer M the only change is in turning the lip $a$ upward from the outer edge of the hook $b$, instead of from the inner edge, and in the carrier N the modification consists in forming the small flange P at the lower edge of the hook $c$ and in bowing the metal composing the hook inward toward the center of the carrier, as shown enlarged in Fig. 13. The purpose of the flange P and of bowing the hook is to strengthen the carrier, which, being of thin sheet metal, might, if the flange were not employed, bend or become disarranged if the attachment were carelessly handled. The bowing of the metal composing the hook $c$, as shown, affords additional strength. Upon the lower part of the pinion Q is formed the post R, which is circular at one side and flat at the other, as shown in Fig. 14, but may be of other suitable irregular outline. The post R is of the same thickness as and is adapted to receive the carrier N and cam C. The carrier N is first inserted on the post R through its conforming aperture T, and then the cam is placed in position.

In assembling the parts the pinion, carrier, and cam are inserted over the pivot U, secured at the center of the presser-foot carrying the detainer M, and when thus arranged the cam C will rest upon the upper surface of the presser-foot and be inclosed by the walls of the central opening in the detainer M, the carrier N resting upon the said detainer over its said opening. When the pinion is rotated, it will actuate the carrier N and cam C direct, and the cam C will simultaneously impart motion to the detainer M, the movements of the carrier and detainer being the same as those of the like elements of Fig. 1 and of the patented device aforesaid.

The object aimed at by this part of the modified form of attachment just described is simplicity of construction. The part R serves to communicate the motion of the pinion to the carrier and detainer, and by its irregular outline prevents the carrier and cam from turning except with it.

What I claim as my invention, and desire to secure by Letters Patent, is—

1. The bracket H, having lips $i\ i$, supporting the post $k$, and the lip $m$, carrying the foot, in combination with the operating-lever I, as described, adapted to actuate the post $k$, the rack F, pinion G, and the thread carrier and detainer and operating mechanism, substantially as set forth.

2. The bracket H, supporting the thread carrier and detainer and actuating mechanism, and provided with the slotted eyes $u\ v$ and (between said eyes) the slot $w$, in combination with the operating-lever I, carrying the downwardly-turned hook $t$, the hook being at a suitable point to receive the loop of embroidering-thread drawn downward between the eyes $u\ v$, substantially as shown and described.

3. In an embroiderer, the foot formed of the parts $d\ e$, the part $d$ having an opening, $h$, to receive the central projection, $g$, of the part $e$, substantially as set forth.

In testimony whereof I affix my signature in presence of two witnesses.

FRANKLIN H. CHILTON.

Witnesses:
　CHAS. C. GILL,
　HERMAN GUSTOW.